United States Patent Office 2,920,119
Patented Jan. 5, 1960

2,920,119
PROCESS FOR PRODUCING PARA-ETHYLTOLUENE

Robert B. Egbert, Roslyn Heights, Ralph Landau, East Hills, and Alfred Saffer, Bayside, N.Y., assignors, by mesne assignments, to Mid-Century Corporation, Chicago, Ill., a corporation of Delaware No Drawing. Application June 2, 1955
Serial No. 512,882

2 Claims. (Cl. 260—671)

This invention relates to process for the preparation of dialkyl benzenes by the reaction of ethylene with toluene in the presence of aluminum chloride or the like catalyst, under conditions to provide an exceptionally high proportion of para-isomer relative to all the other isomers.

The dialkyl benzenes are useful for the preparation of phthalic acids. High purity para-xylene is required for the preparation of high purity terephthalic acid, and a rather complicated and costly refining procedure is involved in preparing it from the commercial xylene mixture. Another drawback of the xylene route is that a very large amount of the meta-isomer is produced also, and from the economic viewpoint, the cost thereof is reflected in the cost of the para-xylene. Furthermore, the supply of commercial xylenes is somewhat limited.

There are available large supplies of low cost toluene and lower olefin raw materials, and these may be reacted in the presence of a Friedel-Crafts catalyst to produce ethyl toluene. In the conventional procedures such reactions give a very high proportion of the meta-isomer (e.g., 72% meta-, 20% para-, and about 8% ortho-). Thus this procedure will give a raw material having many of the drawbacks of commercial xylene. The art is confronted by the problem of providing low cost dialkyl benzenes having a relatively high proportion of the para-isomer relative to all the other isomers.

The discoveries associated with the invention relating to solution of the above problem and the objects achieved in accordance with the invention as set forth herein include the following: a process for the preparation of a dialkyl benzene material having a surprisingly high proportion of para-isomer relative to the other isomers by alkylating toluene with ethylene wherein the mol ratio of total alkyl groups to benzene in the reaction system is in the range of about 1.4 to 2.1; such a process wherein the tri and higher polyalkyl benzenes are disproportionated in the presence of toluene under conditions to produce about 50% of the meta-isomer, 30% of the para-, and 20% of the ortho-; and other objects which will be apparent as details or embodiments of the invention are set forth hereinafter.

The process of this invention may be expressed in detail by the following flow sheet:

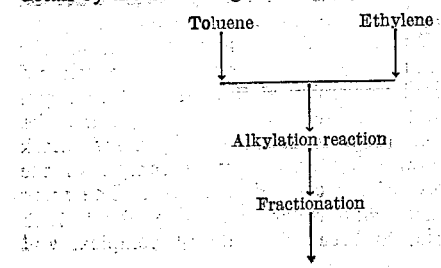

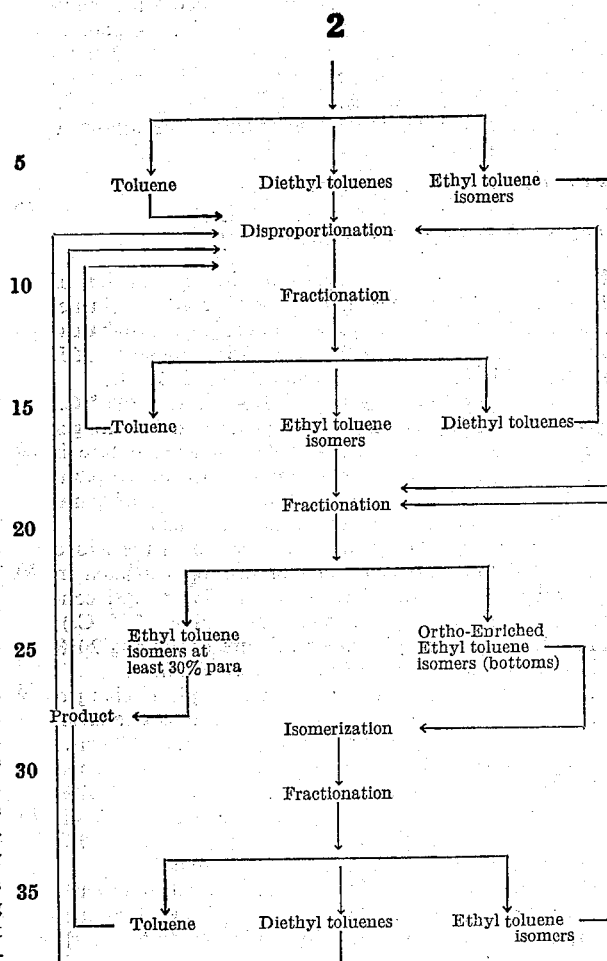

In order to facilitate a clear understanding of the invention, the following preferred specific embodiments are described in detail.

Example 1

Into a suitable reactor having a corrosion resistant inner surface (e.g. glass, ceramic or corrosion resistant metal or alloy), equipped with agitating means such as a gas or mechanical device, and with a means for heating or cooling the contents thereof such as a coil or jacket, a reflux condenser, a gas inlet tube, and optionally a vent for passing off low boiling materials, there are charged:

22.4 parts by weight (0.168 mol) of anhydrous aluminum chloride
11.2 parts (0.143 mol) of isopropyl chloride (or equivalent anhydrous hydrogen chloride)
643 parts (7 mols) of toluene; then
94 parts (3.36 mols) of ethylene is absorbed therein over a period of about 20 minutes, with agitation while the temperature is maintained at about 85–90° C.; the feed rate being about 250 liters per hour at ordinary temperature and pressure (ratio of total alkyl to benzene: 1.49). This temperature may be maintained either by passing cooling water through the indirect heat exchange means if the temperature tends to go too high, or passing steam through these means if the temperature tends to go too low. The reaction mixture is then washed with 0.5 volume of about 18% aqueous hydrochloric acid per volume of reaction mixture, agitated, settled for about 15 minutes. The upper hydrocarbon layer is recovered, washed with about half its volume of about 10% aqueous sodium hydroxide and then given two washings with water (half volume each), and the resulting alkylate was dried with anhydrous calcium chloride and then distilled in a column having a separation efficiency equal to about 10 theoretical plates. For small scale operation this may be a packed column of about 0.5 inch diameter by 3 feet in height packed with $1/16$ inch glass helices. The following three fractions were collected:

50.1% by weight of toluene (B.P. 110° C.)
41.1% ethyl toluene (B.P. 160–165° C.)
8.8% diethyltoluene (B.P. 200–209° C.)

The ethyl toluene cut analyzed an isomer content of 22% ortho-, 43% meta- and 35% para-ethyl toluene. (Accepted infrared analytical procedures, Analytical Chemistry, November 1954, page 1765, January 1955, page 7, Perkin-Elmer News, volume 4, No. 3, 1953.)

If the above reaction were carried out at above 90° C., especially with higher catalyst concentration and longer reaction time, the conventional ethyl toluene mixture is obtained; i.e., about 72% of the meta-, 20% of the para- and 8% of the ortho-isomer. For each part of para-isomer therein there are about 4 parts of meta-.

Any di or higher ethyl toluenes formed in the above reaction system may be reacted or disproportionated in the presence of additional toluene with $1/4$ catalyst concentration and temperature conditions (about 75° C.), and in this way an ethyl toluene mixture containing 20% ortho-, 50% meta-, and 30% para-, is obtained.

The equipment used in the above example is charged with 374 parts of toluene, 481 parts of diethyltoluene, 6.6 parts of anhydrous aluminum chloride and 3.3 parts of ethyl chloride, heated with stirring at 75° C. and maintained at this temperature for 75 minutes gave 28.1% by weight toluene, 40.1% ethyl toluene and 31.8% diethyltoluene; the ethyl toluene fraction analyzed 20% ortho-, 50% meta- and 30% para-ethyl toluene.

The above described reactor is charged with 880 parts of an ortho-ethyl toluene mixture, anhydrous aluminum chloride (13.2 parts) and ethyl chloride (6.6 parts), heated to 75° C. with stirring and maintained at this temperature for 75 minutes gave 15.5% toluene, 50.3% ethyl toluene and 34.2% diethyltoluene (the isomer composition of the ethyl toluene fraction being about 20% ortho-, 50% meta- and 30% para-ethyl toluene).

An ethyl toluene mixture fractionated in a still having a separation efficiency equal to approximately 50 theoretical plate (e.g., a glass column six feet long and one inch in diameter packed with $1/16$ inch glass helices for small scale operation) using a reflux ratio of 100:1 gave an overhead condensate analyzing 9.5% ortho-, 52% meta- and 38.5% para-ethyl toluene. The bottoms analyzed 86% ortho-, 4% meta- and 10% para-ethyl toluene; showing that most of the ortho-isomer may be separated from the mixture.

The above overhead fraction is oxidized in a reactor which may be of the above type, e.g., as follows, using as a charge:

75 parts of the overhead hydrocarbon fraction (9.5% ortho-, 52% meta- and 38.5% para-)
125 parts of acetic acid (99%)
0.75 part manganese acetate
0.75 part cobalt naphthenate
0.75 part ammonium bromide The reaction vessel is about half filled with the liquid mixture.

Air is fed into the reaction mixture at the rate of 400 liters (measured at the exit atmospheric pressure and about 27° C.) per hour, while the reaction mixture is maintained at 205° C., with vigorous agitation, for 2 hours; and the pressure is maintained at about 400 p.s.i.g. (pounds per square inch gage); this pressure being such that the reaction mixture contains a liquid phase containing lower carboxylic acid.

The crude solid dibasic acid in the mixture is separated by filtration, given two washings with about 100% acetic acid (at 50° C.), each washing being with about 75 parts by weight of acetic acid per 100 parts of the wet precipitate, and then given two washings with water, using approximately similar amounts. The acetic acid washings are distilled; the residue may be recycled to the reactor or may be processed to recover dissolved isophthalic acid.

The exit gases from the reactor were passed through two Dry Ice traps in series, and the liquid collected therein during the reaction was washed with about 2 volumes of water to remove water soluble materials therefrom, and then added to the above filtrate. The filtrate was then combined with the residue from the acetic acid washings, and the mixture distilled. The distillate cuts may be recycled to the reactor, e.g., in the next run.

In this manner, a yield of 66.9 parts of crude benzene dicarboxylic acid is obtained, having an acid number of 672 (theory 675).

The above filtrate is flash distilled to remove water and acetic acid, and the residue is then recycled to a further oxidation step (30.7 parts) with addition of 50 parts of the hydrocarbon, and similar amounts of catalyst, and oxidized for 2 hours under the above conditions. This gave 50.5 parts of crude benzene dicarboxylic acid, having an acid number of 670.

The filtrate from the above step was further processed in a similar manner (51.7 parts of residue) with addition of 50 parts of hydrocarbon; and this gave 49.6 parts of crude benzene dicarboxylic acid having an acid number of 670.

The combined product from the foregoing (167 parts) from the combined total fresh feed (175 parts) corresponds to a 95.4% by weight yield of dicarboxylic acids (69% of theory). In addition, additional recovery of dicarboxylic acid may be made by further processing the filtrate, as above.

By following the foregoing operations, with efficient removal of the ortho-isomer, one may end up with a conversion of toluene to terephthalic acid, with simultaneous obtention of only about 1.2–1.4 parts of isophthalic acid per part of terephthalic acid, and this is less than half the isophthalic acid ratio obtained via the above mentioned xylene route.

Desirable or comparable results to the foregoing are obtained with various modifications thereof, such as the following: the alkylation catalyst may be an acid reacting alkylation material such as aluminum chloride or other Friedel-Crafts type catalyst including hydrogen fluoride and boron trifluoride. The reaction temperature may be in the range of −80 to 150° C., preferably 50 to 90° C. for the aluminum chloride catalyst. With hydrogen fluoride or boron trifluoride or mixtures thereof, 50 to 200% of the former and 20 to 50% of the latter (above basis), and a temperature in the range of 0 to 25° C. are used. The reaction time may be in the range of 0.1 to 4 hours, preferably 0.2 to 0.7 hour. Aluminum chloride concentration is 0.5 to 3.5% by weight based on the hydrocarbon, preferably 2 to 3.5%. Higher temperatures are generally associated with shorter times, and the catalyst, temperature and time conditions are selected to give the desired conversion at the desired throughput rates. Additional aluminum chloride catalyst may be added as required (e.g., as determined by a spot-check alkylation reaction using as catalyst a sample of the sludge being recycled for catalytic activity). The spent catalyst is treated with water containing about 15% hydrochloric acid, to break the catalyst complex, and the resulting hydrocarbon phase is separated and reused in the system.

Readily available ethylene stocks may be used, preferably free of other unsaturates. The reaction system may be provided with vents to pass off lower boiling hydrocarbons which do not react therein. The toluene reactant should be free from other aromatics, but may contain some paraffins, which may be saturated out of the system. Desirably it is of low sulfur content and preferably sulfur free.

It is indeed surprising that the process of the invention may be carried out in such a convenient manner, to give the reaction mixture containing the high proportion of the desired para-isomer; and this is reflected in a highly advantageous method for preparing terephthalic acid.

In view of the foregoing discussions, variations and modifications of the invention will be apparent to one skilled in the art, and it is intended to include within the invention all such variations and modifications except as do not come within the scope of the appended claims.

This application is a continuation-in-part of application Serial No. 305,972, filed August 23, 1952, and now abandoned, and, is also a continuation-in-part of application Serial No. 427,864, filed May 5, 1954, now U.S. Patent No. 2,883,438.

We claim:

1. A process for the preparation of an ethyl toluene product fraction being a mixture of ethyl toluene isomers having a para-isomer content of at least 30% from ethylene and toluene including the steps of alkylating, disproportionating and isomerizing which comprises the steps of (A) alkylating toluene with an amount of ethylene to provide in the reaction mixture a mol ratio of alkyl groups to benzene ring of 1.4 to 2.1, in the presence of aluminum chloride and at a temperature in the range of from 50 to 90° C.; (B) fractionating the hydrocarbon mixture produced by said alkylation to obtain a toluene fraction, an ethyl toluene fraction and a diethyl toluene fraction; (C) disproportionating the diethyl toluene from step (B) and diethyl toluene fractions hereinafter derived by reaction with the toluene fraction from step (B) and toluene fractions hereinafter derived, in the presence of aluminum chloride at a temperature not above 90° C.; (D) fractionating the hydrocarbon mixture produced by step (C) to separate a toluene fraction, an ethyl toluene fraction and a diethyl toluene fraction; (E) fractionating the combined ethyl toluene fractions obtained from steps (B) and (D) and hereinafter derived from the isomerization step to obtain as product an overhead ethyl toluene fraction containing at least 30 percent para-isomer and a bottom fraction rich in ortho-isomer; (F) isomerizing said ortho-isomer rich bottom fraction in the presence of aluminum chloride at a temperature not above 90° C.; and (G) fractionating the hydrocarbon mixture obtained from said isomerization to obtain a toluene fraction, an ethyl toluene fraction and a diethyl toluene fraction, wherein each of said steps of alkylating, disproportionating and isomerizing the amount of aluminum chloride is in the range of 0.5 to 3.5 percent by weight based on the hydrocarbon present.

2. The process of claim 1 wherein the amount of aluminum chloride in the alkylating step is about 3% by weight, in the disproportionating step is 0.75% by weight and in the isomerizing step is about 1.5% by weight, each based on the hydrocarbon present.

References Cited in the file of this patent

UNITED STATES PATENTS

| 2,338,711 | D'Ouville et al. | Jan. 11, 1944 |
| 2,398,563 | Smith et al. | Apr. 16, 1946 |
| 2,421,331 | Johnson | May 27, 1947 |
| 2,564,488 | Mahan | Aug. 14, 1951 |
| 2,763,702 | Amos et al. | Sept. 18, 1956 |
| 2,773,108 | Peters | Dec. 4, 1956 |
| 2,778,862 | Gorham et al. | Jan. 22, 1957 |
| 2,818,452 | Mavity | Dec. 31, 1957 |
| 2,848,514 | De Keizer et al. | Aug. 19, 1958 |

OTHER REFERENCES

Berry et al.: Journal Am. Chem. Soc., vol. 49, December 1927, pages 3142–9.